Patented Aug. 2, 1927.

1,637,972

UNITED STATES PATENT OFFICE.

HERMANN SUIDA, OF MODLING, NEAR VIENNA, AUSTRIA.

PROCESS FOR THE PRODUCTION OF ETHYL CHLORIDE.

No Drawing. Application filed February 3, 1925, Serial No. 6,651, and in Austria February 11, 1924.

This invention relates to a process of making ethyl chloride by combining ethylene with dry hydrochloric acid gas with the aid of catalysts and the main feature of the invention resides in the use of temperatures which are below the ordinary temperature or do not exceed it much or which are even below 0° C.

It is well known to prepare ethyl chloride by combining gaseous ethylene with hydrochloric acid gas by or without using catalysts. Hitherto raised temperatures have always been used. When working at ordinary atmospheric pressure and without specific catalysts, the reaction temperature must be raised above 200° C. to obtain a sufficient reaction velocity. But at these temperatures ethyl chloride decomposes partly into its components i. e. the reaction leads to an equilibrium and the yield of ethyl chloride is therefore not satisfactory.

According to German Patent No. 369,702 and French Patent No. 553,065 by increasing the pressure, the result aimed at may be achieved at temperatures between 100° C. and 200° C. and a more complete reaction is obtained, but working with compressed hydrochloric acid gas under these conditions offers considerable technical difficulties.

Even with the aid of more efficient catalysts such as $AlCl_3$ the reaction between ethylene and hydrochloric acid gas has been hitherto only performed at elevated temperatures. But simultaneously a polymerization of the unsaturated hydrocarbon takes place to a large extent, which means not only a loss of material but also causes a rapid decrease of the activity of the catalyst.

According to the present invention the combination of ethylene with hydrochloric acid gas is performed by using suitable catalysts and increased pressure at temperatures very much below those hitherto used, even below the freezing-point of water. Contrary to all expectations the reaction under these circumstances takes place with even considerably greater velocity than at elevated temperatures, the undesired secondary reactions nearly disappear and the yield becomes an excellent one.

As under the aforesaid conditions of pressure and temperature the resulting ethyl chloride is condensed to liquid form, the reaction according to the process described above obviously takes place wholly or almost wholly in the liquid phase. Another mode of execution of the process consists in charging the reaction vessel with liquid ethyl chloride and the catalyst and in then introducing the gaseous mixture of ethylene and dry hydrochloric acid.

Particularly suitable as catalysts are metal chlorides of the type of aluminium chloride and ferric chloride or their double compounds with ethylene.

The invention may be illustrated by the following examples, which do not exclude other methods of performing it:

*Example I.*

Five parts by weight of finely pulverized aluminium chloride are fed into a steel autoclave. A gaseous mixture containing equal parts by volume of ethylene and dry hydrochloric acid gas is then introduced into the autoclave under a pressure of 30 atmospheres. The autoclave is then cooled down so that the temperature in the interior does not exceed 10° C. and the introduction of the gaseous mixture is continued so long as the pressure in the autoclave decreases spontaneously to a noticeable extent.

Finally the temperature is raised to 20° C. and any gases having escaped reaction as well as the ethyl chloride produced which distills at this temperature are allowed to escape through a valve. The ethyl chloride is condensed in any suitable way and separated in a pure state. Within one hour 100 parts by weight of ethyl chloride are obtained.

*Example II.*

An autoclave is charged with five g. of ferric chloride, then cooled down to a temperature of —20 to —10° C. and 50 g. of liquid ethyl chloride are added. By introducing a stream of a gaseous mixture consisting of ethylene and dry hydrochloric acid gas and maintaining the aforesaid low temperature 600 g. of ethyl chloride in addition to the 50 g. of this substance present at the beginning of the process are obtained.

The ethyl chloride produced may be drawn off in liquid form and purified by rectification.

It is desirable to leave each time a part of the liquid ethyl chloride in the reaction vessel, so that a liquid reaction phase exists immediately after the addition of fresh catalyst and fresh gaseous mixture.

What I claim is:

1. Process for the manufacture of ethyl chloride which comprises combining ethylene and dry hydrochloric acid gas with the aid of catalysts at superatmospheric pressure and temperatures not exceeding 10° C.

2. Process for the manufacture of ethyl chloride which comprises combining ethylene and dry hydrochloric acid gas with the aid of catalysts at superatmospheric pressure and temperatures below 0° C.

3. Process for the manufacture of ethyl chloride which comprises combining ethylene and dry hydrochloric acid gas at temperatures below 10° C. with the aid of ferric chloride as a catalyst.

4. Process for the manufacture of ethyl chloride which comprises combining ethylene and dry hydrochloric acid gas with the aid of catalysts at superatmospheric pressure and temperatures below 10° C. in the presence of liquid ethyl chloride.

In testimony whereof I have signed my name to this specification.

HERMANN SUIDA.